US010956197B2

(12) United States Patent
Herbert (10) Patent No.: US 10,956,197 B2
(45) Date of Patent: Mar. 23, 2021

(54) VIRTUAL MACHINE WITH AN EMULATOR MANAGER FOR MIGRATION OF SYNCHRONIZED STREAMS OF STATE DATA

(71) Applicant: CITRIX SYSTEMS, INC., Fort Lauderdale, FL (US)

(72) Inventor: Jennifer Rachel Herbert, Cambridge (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 176 days.

(21) Appl. No.: 15/840,256

(22) Filed: Dec. 13, 2017

(65) Prior Publication Data

US 2019/0179659 A1 Jun. 13, 2019

(51) Int. Cl.
*G06F 9/455* (2018.01)
*G06F 3/06* (2006.01)
*G06F 9/48* (2006.01)

(52) U.S. Cl.
CPC ........ *G06F 9/45558* (2013.01); *G06F 3/0604* (2013.01); *G06F 3/067* (2013.01); *G06F 3/0647* (2013.01); *G06F 3/0664* (2013.01); *G06F 9/4856* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 2011/0302577 A1* | 12/2011 | Reuther | ............... | G06F 9/45558 718/1 |
| 2011/0320556 A1* | 12/2011 | Reuther | ................ | G06F 9/4856 709/213 |
| 2011/0321041 A1* | 12/2011 | Bhat | ...................... | G06F 9/4856 718/1 |
| 2013/0282792 A1* | 10/2013 | Graham | .................. | G06F 21/41 709/203 |
| 2014/0089538 A1* | 3/2014 | Bachrany | .................. | G06F 3/00 710/37 |
| 2015/0261581 A1* | 9/2015 | Wang | ..................... | G06F 9/4856 711/162 |
| 2019/0079695 A1* | 3/2019 | Ekbote | .................. | G06F 3/0656 |
| 2019/0121656 A1* | 4/2019 | Hoppert | .............. | G06F 9/45558 |

* cited by examiner

*Primary Examiner* — Meng Ai T An
*Assistant Examiner* — Zujia Xu
(74) *Attorney, Agent, or Firm* — Allen, Dyer, Doppelt + Gilchrist, PA (57) ABSTRACT

A server includes a hardware platform, a hypervisor platform, and at least one virtual machine operating as an independent guest computing device. The hypervisor includes a memory facilitator, at least one hardware emulator, and an emulator manager. The memory facilitator provides memory for a virtual machine, with the memory having state data associated therewith at a current location within the virtual machine. The at least one hardware emulator provides at least one set of hardware resources for the virtual machine, with the at least one set of hardware resources having state data associated therewith at the current location within the virtual machine. The emulator manager coordinates transfer of the respective state data from the current location to a different location, and tracks progress of the transfer of the respective state data to the different location.

17 Claims, 6 Drawing Sheets

VIRTUAL MACHINE WITH AN EMULATOR MANAGER FOR MIGRATION OF SYNCHRONIZED STREAMS OF STATE DATA

TECHNICAL FIELD

The present disclosure relates to computer virtualization, and more particularly, to the transfer of state data held within a virtual machine.

BACKGROUND

A useful tool in computer virtualization is the ability to live migrate a virtual machine from one server to another server. When the migration is completed, the virtual machine will end up physically running on a different server. The migration is transparent to the virtual machine, and a user of the virtual machine potentially never knows that the virtual machine has been moved.

When a virtual machine is live-migrated from one server to another server, all aspects of virtual machine state needs to be moved. The virtual machine state includes memory image of the virtual machine, contents of CPU registers, and the state of virtualized/emulated hardware devices. Virtualized/emulated hardware devices include, for example, network devices, storage devices or graphics devices.

To minimize downtime during the live-migration, large items of state, such as the main memory image, are copied in an iterative manner with the virtual machine continuing to run on the sending server while the memory is copied. When this initial copy is complete, any memory pages that were modified (i.e., dirtied) while the first copy was taking place are re-sent. This process, referred to as the "live phase," is repeated until either all the pages have been sent without any dirtying taking place, or a maximum number of iterations has been reached at which point the virtual machine is paused while the remaining dirtied pages are copied. This final process is referred to as the "non-live phase."

Live migration has not been possible for all types of virtual machines, with the use of certain features disabling its ability to migrate. One such feature is the use of one or more additional hardware emulators, as used in the case of virtual GPU pass through. This additional emulator may provide a significant improvement in graphics support.

In an example virtualization management platform, such as XenServer by Citrix, every virtual machine is provided with a default emulator (qemu). The default emulator provides a set of default legacy devices that a virtual machine can use to boot, and is hard coded in various places throughout the system. The state of the default emulator is appended to the end of the main migration stream. In this example, there is no prevision for any additional emulators to save their state, and hence migration, as well as suspend/resume, is not possible if using an additional emulator.

SUMMARY

A server includes a hardware platform comprising hardware resources with at least a portion of the hardware resources to be allocated as virtualized resources, a hypervisor being provided based on execution of code instructions by the hardware platform, and at least one virtual machine operating as an independent guest computing device, with at least a portion of the virtualized resources being allocated by the hypervisor to the at least one virtual machine.

The hypervisor may comprise a memory facilitator, and at least one hardware emulator. The memory facilitator may provide memory from the hardware platform for a virtual machine, with the memory having state data associated therewith at a current location within the virtual machine. The at least one hardware emulator may provide at least one set of hardware resources from the hardware platform for the virtual machine, with the at least one set of hardware resources having state data associated therewith at the current location within the virtual machine.

The hypervisor may further comprise an emulator manager configured to coordinate transfer of the respective state data associated with the memory facilitator and the at least one hardware emulator from the current location to a different location, and track progress of the transfer of the respective state data associated with the memory facilitator and the at least one hardware emulator to the different location.

The at least one hardware emulator may comprise a plurality of hardware emulators. The respective state data from the memory facilitator and the plurality of hardware emulator may be transferred in parallel to the different location.

A majority of the respective state data may be transferred while the virtual machine is executing. The emulator manager may be further configured to stop execution of the virtual machine based on the tracked progress reaching a predetermined progress level so as to allow any remaining state data to be transferred to the different location.

The predetermined progress level may correspond to when an amount of state data still needing to be transferred while the virtual machine is executing is not being significantly reduced.

Alternatively, the respective state data may be iteratively transferred to the different location, and the predetermined progress level may be based on a number of iterations having been performed reaching a predetermined number.

The iterative transfer of the state data may include iteratively writing pages to the different location, and if any initial pages that were written to the different location were modified after being sent, then the modified pages are re-sent to the different location. The hypervisor may further include a modified page tracker configured to track the modified pages, and coordinate the same with the memory facilitator and the at least one hardware emulator.

The emulator manager may be further configured to start coordinating the transfer and tracking of the progress of the respective state data based on receiving a start transfer command, and stop coordinating the transfer and tracking of the progress of the respective state data based on completion of the respective state data having been transferred. The hypervisor may further include a toolstack, and wherein the start transfer command may be generated by the toolstack.

The different location receiving the transfer of the respective state data may be a file or disk within the server. Alternatively, the different location receiving the transfer of the respective state data may be a different physical machine.

Another aspect is directed to a method for transferring state data of a virtual machine operating within a server as described above. The method may include operating the memory facilitator to provide memory from the hardware platform for the virtual machine, with the memory having state data associated therewith at a current location within the virtual machine. The at least one hardware emulator may be operated to provide at least one set of hardware resources from the hardware platform for the virtual machine, with the at least one set of hardware resources having state data associated therewith at the current location within the virtual machine. The emulator manager may be operated to coordinate transfer of the respective state data associated with the memory facilitator and the at least one hardware emulator from the current location to a different location, and track progress of the transfer of the respective state data associated with the memory facilitator and the at least one hardware emulator to the different location.

Yet another aspect is directed to a non-transitory computer readable medium for a virtual machine in a server as described above. The non-transitory computer readable medium may have a plurality of computer executable instructions for causing the virtual machine to perform the above method steps.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a method, a data processing system, or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
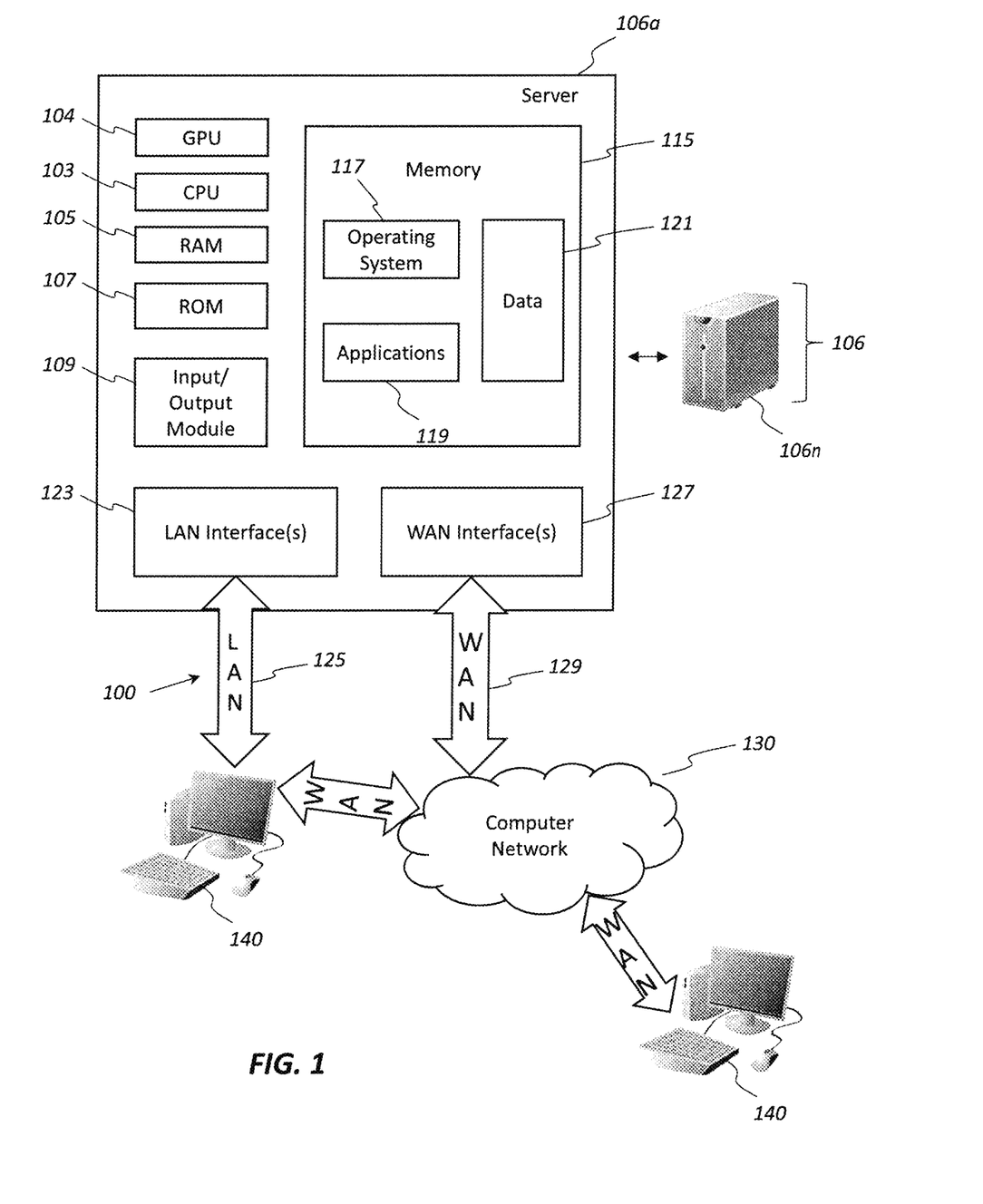
FIG. 1 is a block diagram illustrating a remote-access computing environment that may be used in accordance with one or more illustrative aspects described herein.

FIG. 1 illustrates an example block diagram of a generic computing device, which in the illustrated example is a computer server 106a, in an example computing environment 100. According to one or more aspects, the server 106a may be a single-server or multi-server desktop virtualization system (e.g., a cloud system) configured to provide virtual machines for client access devices. The server 106a illustratively includes a processor 103 for controlling overall operation of the server and its associated components, including random access memory (RAM) 105, read-only memory (ROM) 107, input/output (I/O) module 109, and memory 115. The computer server 106a may also have a graphics processing unit (GPU) 104 for efficiently manipulating computer graphics and image processing.

I/O module 109 may include a mouse, keypad, touch screen, scanner, optical reader, and/or stylus (or other input device(s)) through which a user of generic computing device 106a may provide input, and may also include one or more of a speaker for providing audio output and a video display device for providing textual, audiovisual, and/or graphical output. Software may be stored within memory 115 and/or other storage to provide instructions to processor 103 for enabling the server 106a to perform various functions. For example, memory 115 may store software used by the server 106a, such as an operating system 117, application programs 119, and an associated database 121. Alternatively, some or all of the computer executable instructions for the server 106a may be embodied in hardware or firmware (not shown).

The server 106a may operate in a networked environment supporting connections to one or more remote computers, such as terminals 140 (also referred to as client or user devices). The terminals 140 may be personal computers or servers that include many or all of the elements described above with respect to the server 106a. The network connections depicted in FIG. 1 include a local area network (LAN) 125 and a wide area network (WAN) 129, but may also include other networks. When used in a LAN networking environment, the server 106a may be connected to the LAN 125 through a network interface or adapter 123. When used in a WAN networking environment, the server 106a may include a modem 127 or other network interface for establishing communications over the WAN 129, such as computer network 130 (e.g., the Internet). It will be appreciated that the network connections shown are illustrative and other means of establishing a communications link between the computers may be used.

The generic computing device and/or terminals 140 may also be mobile terminals (e.g., mobile phones, smartphones, PDAs, notebooks, etc.) including various other components, such as a battery, speaker, and antennas (not shown) in some embodiments.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as server(s) 106). In one embodiment, the computing environment 100 can include an appliance installed between the server(s) 106 and client device(s) 140. This appliance can manage client/server connections, and in some cases can load balance client connections amongst a plurality of backend servers 106.

The client device(s) 140 can in some embodiments be referred to as a single client device 140 or a single group of client devices 140, while server(s) 106 may be referred to as a single server 106 or a single group of servers 106. In one embodiment, a single client device 140 communicates with more than one server 106, while in another embodiment a single server 106 communicates with more than one client device 140. In yet another embodiment, a single client device 140 communicates with a single server 106.

A client device 140 can, in some embodiments, be referenced by any one of the following terms: client machine(s); client(s); client computer(s); client device(s); client computing device(s); user device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client device 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client device 140.

The client device 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a client agent application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client device 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106a-106n such that the servers 106a-106n are logically grouped together into a server farm, for example, in a cloud computing environment. The server farm can include servers 106 that are geographically dispersed and logically grouped together in a server farm, or servers 106 that are located proximate to each other and logically grouped together in a server farm. Geographically dispersed servers 106a-106n within a server farm can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm may be administered as a single entity, while in other embodiments the server farm can include multiple server farms.

In some embodiments, a server farm can include servers 106 that execute a substantially similar type of operating system platform (e.g., WINDOWS, manufactured by Microsoft Corp. of Redmond, Wash., UNIX, LINUX, or MAC OS). In other embodiments, the server farm can include a first group of servers 106 that execute a first type of operating system platform, and a second group of servers 106 that execute a second type of operating system platform. The server farm, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality.

Some embodiments include a first server 106a that receives requests from a client device 140, forwards the request to a second server 106n, and responds to the request generated by the client device 140 with a response from the second server 106n. The first server 106a can acquire an enumeration of applications available to the client device 140 as well as address information associated with an application server 106 hosting an application identified within the enumeration of applications. The first server 106a can then present a response to the client's request using a web interface, and communicate directly with the client device 140 to provide the client device 140 with access to an identified application.

Client devices 140 can, in some embodiments, be a client node that seeks access to resources provided by a server 106. In other embodiments, the server 106 may provide client devices 140 or client nodes with access to hosted resources.

The server 106, in some embodiments, functions as a master node such that it communicates with one or more client devices 140 or servers 106. In some embodiments, the master node can identify and provide address information associated with a server 106 hosting a requested application, to one or more client devices 140 or servers 106. In still other embodiments, the master node can be a server farm, a client device 140, a cluster of client nodes, or an appliance.

One or more client devices 140 and/or one or more servers 106 can transmit data over a network 130 installed between machines and appliances within the computing environment 100. The network 130 can comprise one or more sub-networks, and can be installed between any combination of the client devices 140, servers 106, computing machines and appliances included within the computing environment 100. In some embodiments, the network 130 can be: a local-area network (LAN); a metropolitan area network (MAN); a wide area network (WAN); a primary network comprised of multiple sub-networks located between the client devices 140 and the servers 106; a primary public network (e.g., the Internet) with a private sub-network; a primary private network with a public sub-network; or a primary private network with a private sub-network.

Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed, A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 2:
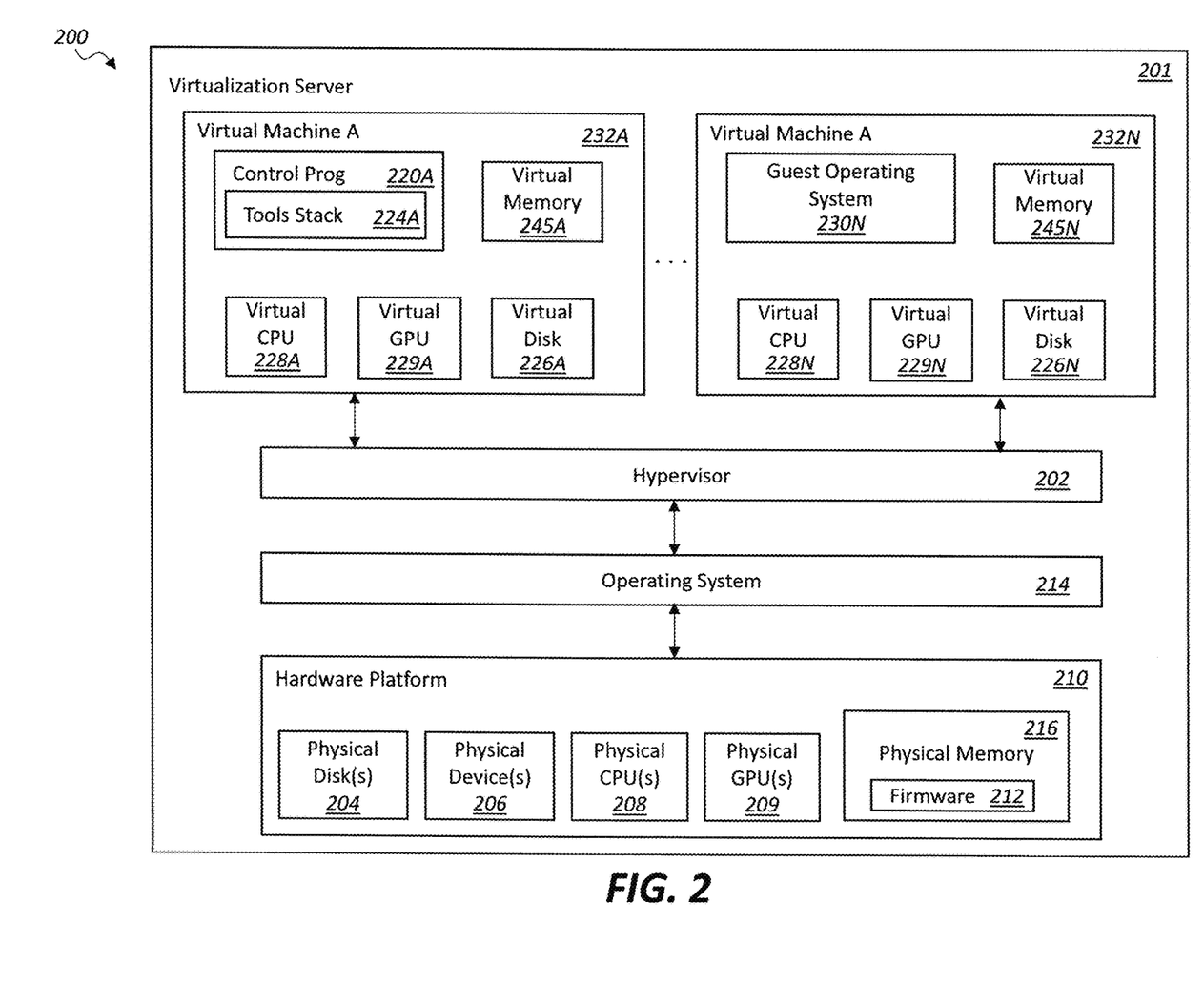
FIG. 2 is a block diagram illustrating a virtualized computing environment that may be used in accordance with one or more illustrative aspects described herein.

Illustrated in FIG. 2 is one embodiment of a computer device 201 configured as a virtualization server in a virtualization environment, for example, a single-server, multi-server, or cloud computing environment. The virtualization server 201 illustrated in FIG. 2 can be deployed as and/or implemented by one or more embodiments of the server 106 illustrated in FIG. 1 or by other known computing devices. Included in virtualization server 201 is a hardware layer that can include one or more physical disks 204, one or more physical devices 206, one or more physical central processing units (CPUs) 208, one or more physical graphic processing units (GPUs) 209, and one or more a physical memories 216. In some embodiments, firmware 212 can be stored within a memory element in the physical memory 216 and can be executed by one or more of the one or more of the physical CPUs 208 and GPUs 209. Programs or executable instructions stored in the physical memory 216 can be executed by the one or more physical CPUs 208 and GPUs 209.

The virtualization server 201 may further include an operating system 214 that may be stored in a memory element in the physical memory 216 and executed by one or more of the physical CPUs 208. Still further, a hypervisor 202 may be stored in a memory element in the physical memory 216 and can be executed by one or more of the physical processors 208. Executing on one or more of the physical CPUs 208 may be one or more virtual machines 232a-232n (generally referred to as virtual machine(s) 232). Each virtual machine 232 may have a virtual disk 226a-226n, a virtual CPU 228a-228n, a virtual GPU 229a-229n, and a virtual memory 245a-245n. In some embodiments, a first virtual machine 232a may execute, on the virtual CPU 228a, a control program 220a that includes a tools stack 224a. In other embodiments, one or more virtual machines 232n may execute, on the virtual CPU 228n, a guest operating system 230n.

Further referring to FIG. 2, and in more detail, the virtualization server 201 may include a hardware layer 210 with one or more pieces of hardware that communicate with the virtualization server 201. In some embodiments, the hardware layer 210 can include one or more physical disks 204, one or more physical devices 206, one or more physical central processing units (CPUs) 208, one or more physical graphics processing units (GPUs) 209, and one or more memories 216. Physical components 204, 206, 208, 209, and 216 may include, for example, any of the components described above with respect to FIG. 1. For instance, physical disks 204 may include permanent memory storage, temporary memory storage, disk drives (e.g., optical, floppy, tape), hard disks, external hard drives, flash memory, network-attached storage, a storage-area network, or any other storage repository that the virtualization server 201 can access.

Physical devices 206 may include any device included in the virtualization server 201 and/or any combination of devices included in the virtualization server 201 and external devices that communicate with the virtualization server 201. A physical device 206 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201.

The physical memory 216 in the hardware layer 210 may include any type of memory. The physical memory 216 may store data, and in some embodiments may store one or more programs, or set of executable instructions. FIG. 2 illustrates an embodiment where firmware 212 is stored within the physical memory 216 of the virtualization server 201. Programs or executable instructions stored in the physical memory 216 can be executed by the one or more CPUs 208 and GPUs 209 of the virtualization server 201.

Virtualization server 201 may also include a hypervisor 202. In some embodiments, the hypervisor 202 may be a program executed by processors 208 on the virtualization server 201 to create and manage any number of virtual machines 232. The hypervisor 202 can be referred to as a virtual machine monitor, or platform virtualization software. In some embodiments, the hypervisor 202 can be any combination of executable instructions and hardware that monitors virtual machines executing on a computing machine. The hypervisor 202 may be a Type 2 hypervisor, or a hypervisor that executes within an operating system 214 executing on the virtualization server 201.

A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201 in a virtualization environment may include a Type 1 hypervisor (Not Shown).

A Type 1 hypervisor may execute on the virtualization server 201 by directly accessing the hardware and resources within the hardware layer 210. That is, while a Type 2 hypervisor 202 accesses system resources through a host operating system 214, a Type 1 hypervisor may directly access all system resources without needing a host operating system 214. A Type 1 hypervisor may execute directly on one or more physical CPUs 208 of the virtualization server 201, and may include program data stored in the physical memory 216.

The hypervisor 202, in some embodiments, can provide virtual resources to operating systems 230n or control programs 220a executing on virtual machines 232 in any manner that simulates the operating systems 230n or control programs 220a having direct access to system resources. System resources can include: physical devices 206; physical disks 204; physical CPUs 208; physical GPUs 209; physical memory 216 and any other component included in the virtualization server 201 hardware layer 210. In these embodiments, the hypervisor 202 may be used to emulate virtual hardware, partition physical hardware, virtualize physical hardware, or execute virtual machines that provide access to computing environments.

In still other embodiments, the hypervisor 202 controls processor scheduling and memory partitioning for a virtual machine 232 executing on the virtualization server 201. The hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 201 executes a hypervisor 202 that creates a virtual machine platform on which guest operating systems may execute.

In these embodiments, the virtualization server 201 can be referred to as a host server. An example of such a virtualization server is XEN SERVER provided by Citrix Systems, Inc., of Fort Lauderdale, Fla. Virtual app and desktop sessions may further be provided by XENAPP AND XENDESKTOP, also from Citrix Systems. XENAPP is an application virtualization solution that enhances productivity with universal access to virtual apps, desktops, and data from any device. XENDESKTOP incorporates the same functionality as XenApp, plus the option to implement a scalable VDI solution.

The hypervisor 202 may create one or more virtual machines 232a-232n (generally virtual machine(s) 232) in which guest operating systems 230n (generally virtual machine 230) execute. In some embodiments, the hypervisor 202 may load a virtual machine image to create a virtual machine 232. In other embodiments, the hypervisor 202 may execute a guest operating system 230 within the virtual machine 232. In still other embodiments, the virtual machine 232 may execute the guest operating system 230.

In addition to creating virtual machines 232, the hypervisor 202 may control the execution of at least one virtual machine 232. In other embodiments, the hypervisor 202 may present at least one virtual machine 232 with an abstraction of at least one hardware resource provided by the virtualization server 201 (e.g., any hardware resource available within the hardware layer 210). In other embodiments, the hypervisor 202 may control the manner in which virtual machines 232 access the physical CPUs 208 and physical GPUs 209 available in the virtualization server 201. Controlling access to the physical CPUs 208 and physical GPUs 209 may include determining whether a virtual machine 232 should have access to a CPU 208 or GPU 209, and how physical processor capabilities are presented to the virtual machine 232.

As shown in the example of FIG. 2, the virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device.

While FIG. 2 illustrates an embodiment where a virtualization server 201 hosts A through N virtual machines 232, in other embodiments, the virtualization server 201 can host any number of virtual machines 232. The hypervisor 202, in some embodiments, provides each virtual machine 232 with a unique virtual view of the physical hardware, memory, processor and other system resources available to that virtual machine 232.

In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202 may create one or more unsecure virtual machines 232 and one or more secure virtual machines 232.

Unsecure virtual machines 232 may be prevented from accessing resources, hardware, memory locations, and programs that secure virtual machines 232 may be permitted to access. In other embodiments, the hypervisor 202 may provide each virtual machine 232 with a substantially similar virtual view of the physical hardware, memory, processor and other system resources available to the virtual machines 232.

Each virtual machine 232 may include a virtual disk 226a-226n (generally virtual disk 226), a virtual CPU 228a-228n (generally CPU 228), a virtual GPU 229a-229n (generally GPU 229), and a virtual memory 245a-245n (generally virtual memory 245). The virtual disk 226, in some embodiments, is a virtualized view of one or more physical disks 204 of the virtualization server 201, or a portion of one or more physical disks 204 of the virtualization server 201.

The virtualized view of the physical disks 204 can be generated, provided, and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual CPU 228 can be a virtualized view of one or more physical CPUs 208 of the virtualization server 201. A virtual GPU 229 can be a virtualized view of one or more physical GPUs 209 of the virtualization server 201. In some embodiments, the virtualized view of the physical CPUs 228 and GPUs 229 can be generated, provided, and managed by the hypervisor 202. In some embodiments, the virtual CPU 228 has substantially all of the same characteristics of at least one physical CPU 208, and the virtual GPU 229 has substantially all of the same characteristics of at least one physical GPU 209.

In other embodiments, the virtual CPU 228 provides a modified view of the physical CPUs 208 such that at least some of the characteristics of the virtual CPUs 228 are different than the characteristics of the corresponding physical CPU 208, and the virtual GPU 229 provides a modified view of the physical GPUs 209 such that at least some of the characteristics of the virtual GPU 229 are different than the characteristics of the corresponding physical GPU 208.

As noted in the background, a useful tool for a virtual machine is to be able to migrate (or transfer) the virtual machine from a host physical machine to a different physical machine. Migration involves the transfer of state data associated with the virtual machine, such as virtual machine 232a to the other physical machine, such as virtual machine 232n. This allows the host physical machine to be replaced, for example, without any noticeable interruption to the user of the virtual machine 232a.

Another useful tool for a virtual machine 232 is to be able to transfer state data associated with the virtual machine from a current location within the host physical machine to a different location within the same host physical machine. The transfer of state data to a different location within the same host machine may be referred to as suspend and resume, or check pointing.

In suspend and resume, the state data is transferred to a file or disk within the host physical machine and operation of the virtual machine 232 is then suspended after the transfer. During the suspend period, maintenance may be performed on the host physical machine, for example. At a later point in time, the virtual machine 232 may be resumed based on the state data transferred to the file or disk.

In check pointing, a snapshot of the state data associated with the virtual machine at a particular point of execution is taken. The snapshot is similar to hitting a save button during execution of an application, for example. The snapshot involves the transfer of state data at the particular point of execution of the virtual machine to the file or disk within the host physical machine while the virtual machine is still running.

A server 106 as discussed above may be configured as a host physical machine, and includes a hardware platform 210 and a hypervisor 202. The hardware platform 210 includes hardware resources with at least a portion of the hardware resources being allocated as virtualized resources. The hypervisor 202 is provided based on execution of code instructions by the hardware platform 210. At least one virtual machine 232 is operating as an independent guest computing device, with at least a portion of the virtualized resources being allocated by the hypervisor 202 to the at least one virtual machine 232. In other embodiments, the illustrated server 106 may be a virtual server.

Figure 3:
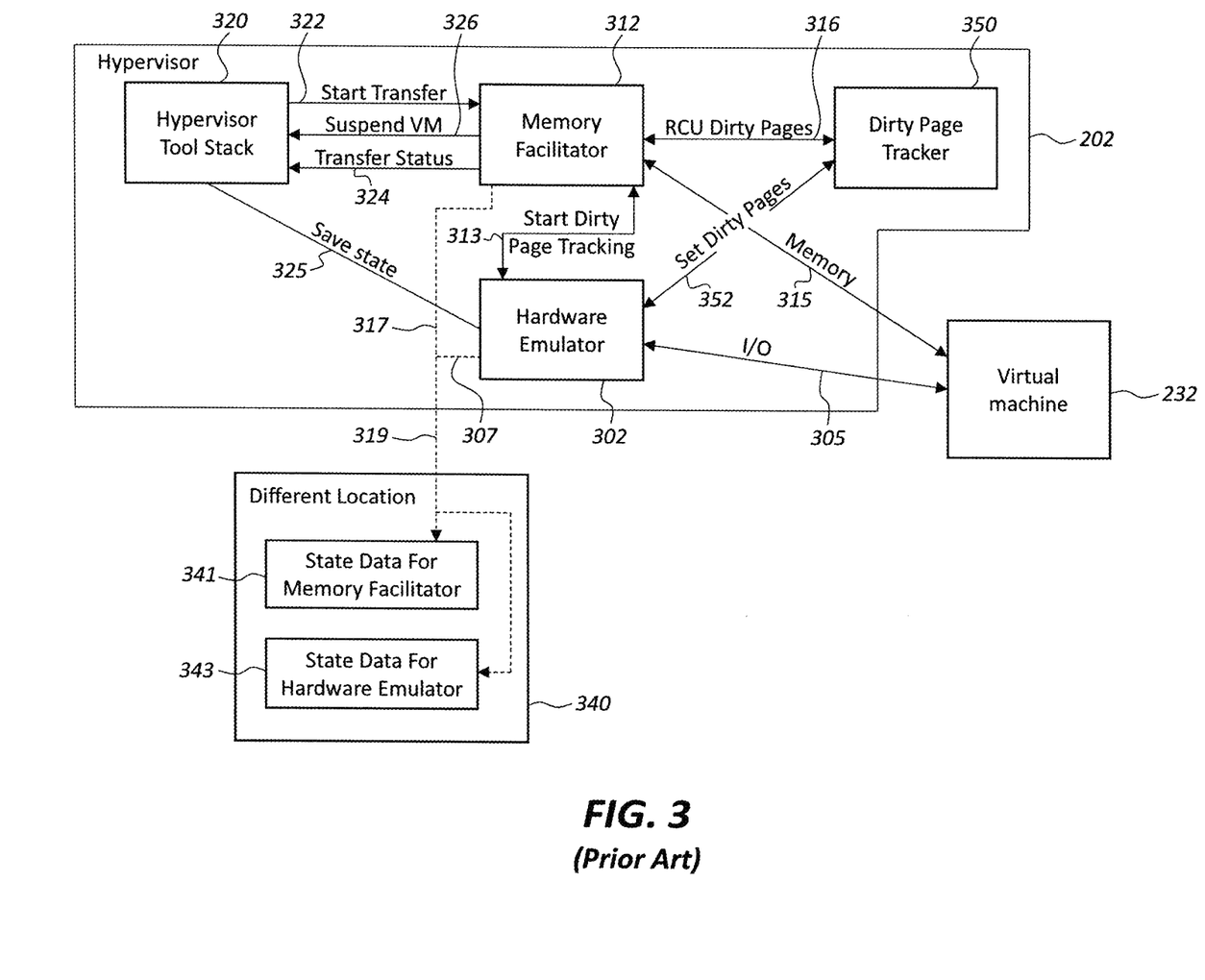
FIG. 3 is a more detailed block diagram of a traditional hypervisor illustrating communications supporting the transfer of state data from a current location within a virtual machine to a different location in accordance with the prior art.

Referring now to FIG. 3, a traditional hypervisor 202 is provided with a hardware emulator 302 and a memory facilitator 312. The hardware emulator 302 typically emulates or provides a set of devices from the hardware platform 210 that the virtual machine 232 can use to boot. The memory facilitator 312 may not technically be an emulator, but for discussion purposes, is being referred to as a memory facilitator. Alternatively, the memory facilitator 312 may be referred to as a pseudo memory emulator.

An example virtualization management platform is XenServer by Citrix. In XenServer, the hardware emulator 302 is referred to as a default emulator (qemu) and provides a set of default legacy devices. The memory facilitator 312 in XenServer is referred to as XenGuest. In the illustrated example, the hardware emulator 302 provides input/output for the virtual machine 232, as indicated by reference 305. The memory facilitator 312 provides the memory for the virtual machine 232 as indicated by reference 315.

To start transfer of the state data from the current location within the virtual machine 232 to a different location within the illustrated example, a hypervisor toolstack 320 sends a start transfer command to the memory facilitator 312 as indicated by reference 322, and a save state command to the hardware emulator 302 as indicated by reference 325. An operator of the server 106 or the virtual machine 232 may interact with the hypervisor toolstack 320 to initiate this transfer of state data.

The different location receiving the state data is represented by reference 340. State data from the memory facilitator 312 is transferred from its current location to the different location 340 as represented by reference 317, and state data from the hardware emulator 302 is also transferred from its current location to the different location 340 as represented by reference 307. Since the state data is not being transferred in parallel, a shared path or pipe 319 is used to transfer the state data. Once the transferred state data is received at the different location 340, then it is split to their respective locations 341, 343. As discussed above, the different location 340 may be within the same host physical machine or on a different physical machine. For discussion purposes, the different location 340 includes location 341 receiving the state data for the memory facilitator 312, and location 343 receiving the state data for the hardware emulator 302.

The hypervisor 202 also includes a modified or dirty page tracker 350. The memory facilitator 312, in response to the start transfer command 322 from the toolstack 320, writes memory pages to the different location 341. This transfer of state data from the memory facilitator 312 to the different location may be an iterative process.

If any of the initial memory pages that were written to the different location 341 were modified after being sent to the different location 341, then the modified memory pages are referred to as dirty pages. The memory facilitator 312 communicates with the dirty page tracker 350, as indicated by reference 316 when transferred memory pages have been modified (i.e., dirtied) after having been initially transferred.

The memory facilitator 312 also communicates with the hardware emulator 302 via reference 313 to start dirty page tracking as well. The dirty page tracker 350 also interfaces with the hardware emulator 302 via reference 352 to provide an indication of which pages have been dirtied, i.e., set dirty pages. The dirty page tracker 350 tracks the status of dirty pages generated by the memory facilitator 312 and by the hardware emulator 302, and helps to coordinate and synchronize the transfer to the different location 340.

The virtual machine 232 is operating while the state data is being transferred from the memory facilitator 312 and the hardware emulator 302 to the different location 340. This part of the process is referred to as a live phase since the virtual machine 232 is still executing.

The live phase process continues until either all the pages have been sent over the shared pipe 319 without any more dirtying taking place, or a maximum number of iterations has been reached at which point the virtual machine 232 is paused while the remaining dirtied pages are copied. This part of the process is referred to as a non-live phase since the virtual machine 232 has stopped executing, i.e., paused.

A status of the state data transfer is provided to the toolstack 320 via reference 324 from the memory facilitator 312. When the virtual machine 232 is to be suspended so that the remaining dirty pages can be transferred to the different location 340, a suspend command is sent to the toolstack 320 via reference 326. The suspend command 326 stops execution of the virtual machine 232 and allows for final synchronization, wherein the remaining dirty pages are transferred. The stoppage by the suspend command 326 is in the several hundred millisecond range, which allows for an illusion of a seamless transfer to the user.

Figure 4:
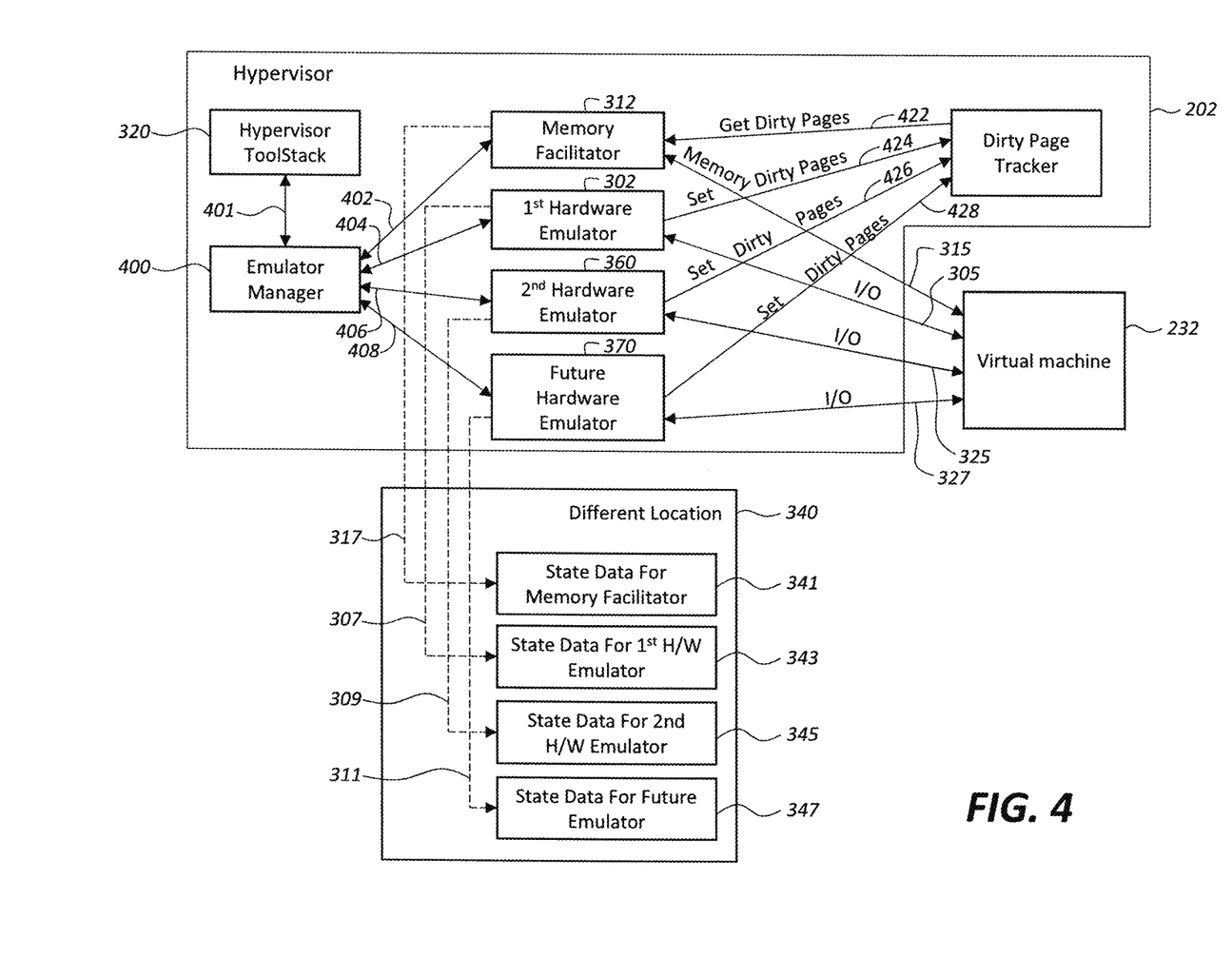
FIG. 4 is a more detailed block diagram of the hypervisor shown in FIG. 2 illustrating communications supporting the transfer of state data from a current location within a virtual machine to a different location in accordance with one or more illustrative aspects described herein.

Referring now to FIG. 4, a problem for the traditional hypervisor 202 as discussed above is when a second hardware emulator 360 is added. There is no provision within the hypervisor to support a second hardware emulator 360 when state data is to be transferred from its current location within the virtual machine 232 to a different location 340. Consequently, activities such as migration, suspend and resume, and check pointing as discussed above are not possible when the second hardware emulator 360 is added to the hypervisor 202.

The second hardware emulator 360 may emulate an accelerated graphics card, for example. Even though the first hardware emulator 302 may emulate a standard graphics card, emulation of an accelerated graphics card by the virtual machine 232 provides a significant improvement in graphics support.

As shown in FIG. 4, an emulator manager 400 has been added to manage any number of emulators, and coordinate their activities during migration, suspend and resume, and check pointing. The hypervisor toolstack 320 triggers these activities by sending a transfer command to the emulator manager 400 via reference 401. Before, the hypervisor toolstack 320 had to interface with multiple components (i.e., memory facilitator 312 and hardware emulator 302). Now, the hypervisor toolstack 320 only needs to interface with the emulator manager 400 to coordinate the transfer of state data from the memory facilitator 312 and the various hardware emulators 302, 360 from their current location within the virtual machine 232 to a different location 340.

As discussed above, the different location 340 may be within the same host physical machine or on a different physical machine. State data from the memory facilitator 312 and the various hardware emulators 302, 360 are transferred in parallel, i.e., over separate pipes. State data from the memory facilitator 312 is transferred from its current location to the different location 340 as represented by reference 317. State data from the first hardware emulator 302 is transferred from its current location to the different location 340 as represented by reference 307. Similarly, state data from the second hardware emulator 360 is transferred from its current location to the different location 340 as represented by reference 309. The hypervisor 202 allows growth for one or more future hardware emulators 370 to be added. Here, the state data from the future hardware emulator 370 would be transferred from its current location to the different location 340 as represented by reference 311. For discussion purposes, the different location 340 includes location 341 receiving the state data for the memory facilitator 312, location 343 receiving the state data for the first hardware emulator 302, location 345 receiving the state data for the second hardware emulator 302, and location 347 receiving the state data for the future hardware emulator 370.

In the illustrated example, the first hardware emulator 302 provides input/output for the virtual machine 232, as indicated by reference 305. The memory facilitator 312 provides the memory for the virtual machine 232 as indicated by reference 315. The second hardware emulator 302 provides input/output for the virtual machine 232, as indicated by reference 325. If a future hardware emulator 370 were added, it would provide input/output for the virtual machine 232, as indicated by reference 327.

To start transfer of the state data from the current location within the virtual machine 232 to a different location 340, the hypervisor toolstack 320 sends a start transfer command to the emulator manager 400 as indicated by reference 401. The emulator manager 400 then communicates with the memory facilitator 312 and each of the emulators 302, 360, 370. More particularly, the emulator manager 400 communicates with the memory facilitator 312 via path 402. The emulator manager 400 communicates with the first, second and future hardware emulators 302, 360, 370 via respective paths 404, 406, 408.

The emulator manager 400 treats the memory facilitator 312 and all of the emulators the same, where any variations of behavior are configured in a configuration file. For the transfer of state data from a current location to a different location 340, the emulator manager 400 moves though all the stages involved in that process, signaling the respective emulators 302, 312, 360, 370 via an inter-process communications (IPC), to perform each stage. The emulators 302, 312, 360, 370 perform certain tasks, such as transferring their state data in parallel, while the emulator manager 400 tracks the progress of each emulator and determines when each emulator has completed transfer of its state data.

The memory facilitator 312, in response to communications form the emulator manager 400, writes memory pages to the different location 340. This transfer of state data from the memory facilitator 312 to the different location 340 may be an iterative process. If any of the initial memory pages that were written to the different location 340 were modified (i.e., dirtied) after being sent to the different location 340, then the modified memory pages are reported to the dirty page tracker 350 via reference 422.

The dirty page tracker 350 interfaces with the first hardware emulator 302 via reference 424 to provide an indication of which pages have been dirtied, i.e., set dirty pages. Similarly, the dirty page tracker 350 interfaces with the second and future hardware emulators 360, 370 via respective references 426, 428 to provide an indication of which pages have been dirtied, i.e., set dirty pages.

During live migration, the emulator manager 400 is configured to determine the best time to transition to the non-live phase, where the memory facilitator 312 and certain emulators 302, 360, 370 are unlikely to ever complete their state transfer. Instead, the memory facilitator 312 and certain emulators 302 360, 370 may reach a point where little progress is being made. Not all emulators support each stage, and as such, they can be configured in a configuration stage to skip these stages.

The emulator manager 400 is configured to pass any parameters needed for the task to the memory facilitator 312 and to the respective emulators 302, 360, 370. For example, this includes passing file descriptors to the memory facilitator 312 and the emulators 302, 360, 370, such that their state may be sent via the file descriptors. In some cases, the hypervisor toolstack 320 may pass file descriptors to the emulator manager 400 for it to distribute to the memory facilitator 312 and the emulators 302, 360, 370.

In a case such as migration, where each file descriptor connects with a corresponding receiving process on a different physical host, by each emulator having its own file descriptor, they can each transfer their state data in parallel. This avoids any unnecessary delay caused by serialization/synchronization, advantageously keeping migration downtime to a minimum. In other cases, such as suspending the state of the virtual machine 232 to a single file, one file descriptor will need to be shared between multiple emulators. In this case the emulator manager 400 ensures that this is done in a synchronized way so as to avoid each emulator interfering with the other emulators.

Figure 5:
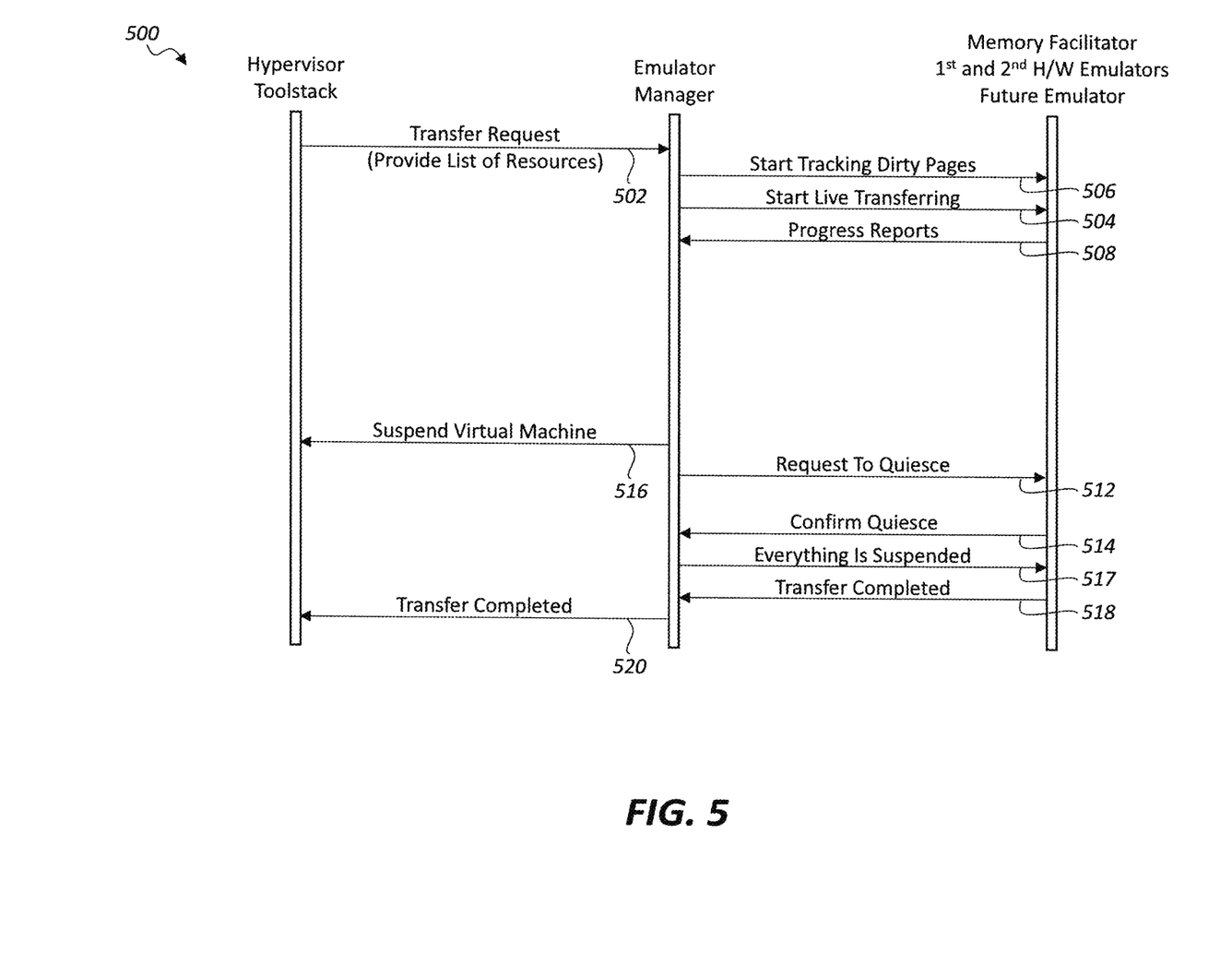
FIG. 5 is a flow diagram illustrating interaction of the emulator manager within the hypervisor shown in FIG. 4 in accordance with one or more illustrative aspects described herein.

Turning now to FIG. 5, a flow diagram 500 illustrating interaction of the emulator manager 400 within the hypervisor 202 will be discussed in greater detail. The emulator manager 400 is configured to start coordinating the transfer and tracking of the progress of the respective state data based on receiving a transfer request 502 or a start transfer command from the hypervisor toolstack 320. A list of resources (e.g., the memory facilitator and the emulators) is provided to the emulator manager 400 as part of the transfer request 502.

For discussion purposes, the memory facilitator 312, the first hardware emulator 302, the second hardware emulator 360 and the future hardware emulator 370 will be collectively referred to as facilitator/emulators. The respective state data is advantageously transferred from the facilitator/emulators in parallel to the different location 340.

The emulator manager 400 communicates to each of the facilitator/emulators via reference 504 to start live transferring of the respective state data associated with the emulators to the different location 340, and to start tracking the dirty pages generated by the facilitator/emulators via reference 506. During the transfer of state data to the different location 340, the facilitator/emulators provide progress reports via references 508 to the emulator manager 400.

A majority of the respective state data are transferred while the virtual machine is executing. The emulator manager is configured to stop execution of the virtual machine 232 based on the tracked progress reports reaching a predetermined progress level so as to allow any remaining state data to be transferred to the different location.

The emulator manager 400 sends a request to quiesce to the emulators via reference 512. When the emulators are at a point to stop executing, i.e., pause, the emulators send a confirm suspend reply to the emulator manager 400 via reference 514. At this point, the emulator manager 400 sends an everything is suspended reply via reference 517 to the emulators so that they know nothing else can be changed and it is safe to finish off the transmigration of state data. The emulator manager 400 then communicates to the toolstack 320 that the virtual machine 232 has been suspended via reference 516.

The predetermined progress level may be based on when an amount of state data still needing to be transferred while the virtual machine 232 is executing is not being significantly reduced. In other words, the amount of data needing to be transferred is not proportional or does not have the same magnitude to the amount of data that is actually being transferred.

In another approach, the respective state data are iteratively transferred to the different location 340. The predetermined progress level may now be based on a number of iterations having been performed reaching a predetermined number. More particularly, the iterative transfer of the state data comprises iteratively writing pages to the different location 340, and if any initial pages that were written to the different location were modified after being sent, then the modified pages are re-sent to the different location 340. If the number of iterations being performed in resending the dirty or modified pages reaches the predetermined number, then the predetermined progress level is reached and the virtual machine 232 is suspended.

While the virtual machine 232 is suspended, the remaining state data is transferred to the different location 340. When this transfer is complete, the emulators report this to the emulator manager 400 via reference 518. In turn, the emulator manager 400 reports that the transfer has been completed to the hypervisor toolstack 320 via reference 520. At this point, the emulator manager 400 stops coordinating the transfer and tracking of the progress of the respective state data based on completion of the respective state data having been transferred. The virtual machine 232 may now start executing again after the state data has been transferred.

Figure 6:
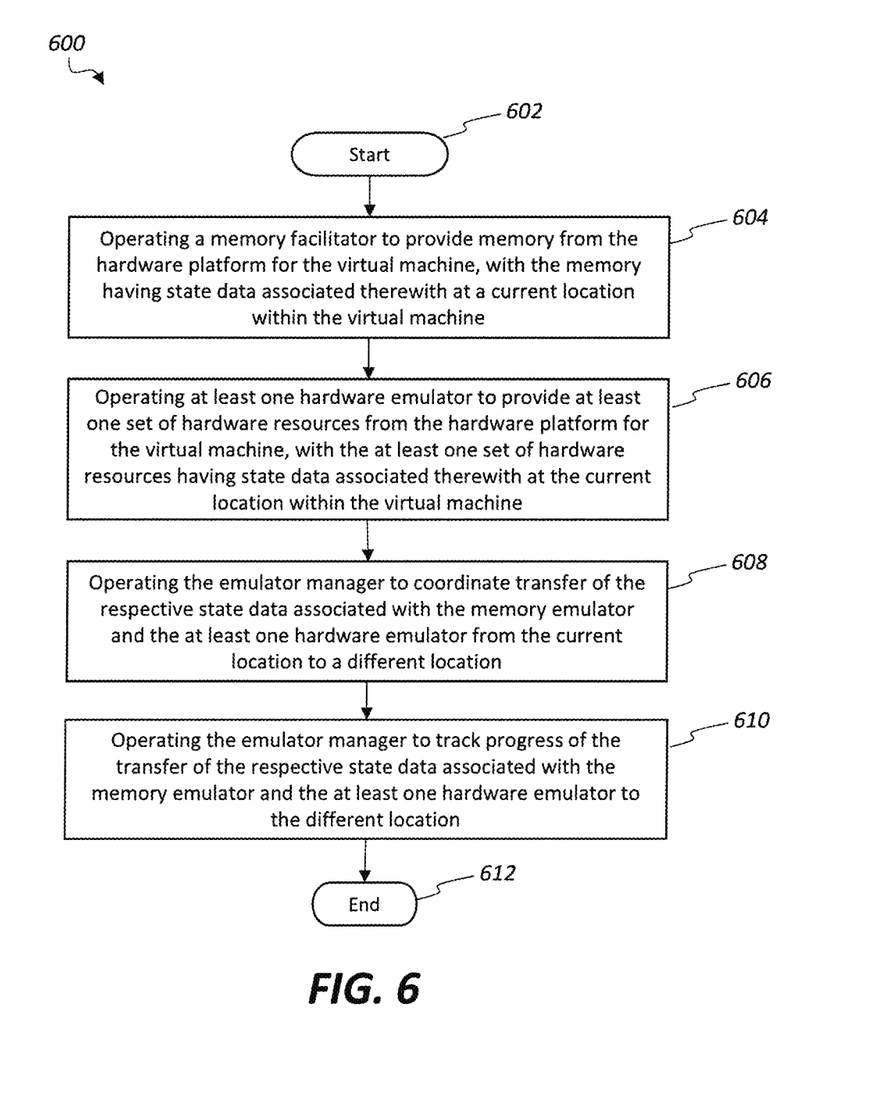
FIG. 6 is a flowchart illustrating a method for transferring state data from a current location within a virtual machine to a different location in accordance with one or more illustrative aspects described herein.

Referring now to the flowchart 600 in FIG. 6, a method for transferring state data of a virtual machine 232 operating within a server 106 as described above is provided. The server 106 includes a hardware platform 210 and a hypervisor 202, with the hypervisor 202 comprising a memory facilitator 312, at least one hardware emulator 302, 360, and an emulator manager 400. From the start (Block 602), the method includes operating the memory facilitator 312 at Block 604 to provide memory from the hardware platform 210 for the virtual machine 232, with the memory having state data associated therewith at a current location within the virtual machine 232.

The at least one hardware emulator 302, 360 is operated at Block 606 to provide at least one set of hardware resources from the hardware platform 210 for the virtual machine 232, with the at least one set of hardware resources having state data associated therewith at the current location within the virtual machine 232. The emulator manager 400 is operated to coordinate transfer of the respective state data associated with the memory facilitator 312 and the at least one hardware emulator 302, 360 from the current location to a different location at Block 608, and track progress of the transfer of the respective state data associated with the memory facilitator 312 and the at least one hardware emulator 302, 360 to the different location at Block 610. The method ends at Block 612.

Yet another aspect is directed to a non-transitory computer readable medium for a virtual machine 232 in a server 106 comprising a hardware platform 210 and a hypervisor 202, with the hypervisor 202 comprising a memory facilitator 312, at least one hardware emulator 302, 360, and an emulator manager 400. The non-transitory computer readable medium has a plurality of computer executable instructions for causing the virtual machine 232 to perform the following steps.

The memory facilitator 312 is operated to provide memory from the hardware platform 210 for the virtual machine 232, with the memory having state data associated therewith at a current location within the virtual machine 232. The at least one hardware emulator 302, 360 is operated to provide at least one set of hardware resources from the hardware platform 210 for the virtual machine 232, with the at least one set of hardware resources having state data associated therewith at the current location within the virtual machine 232. The emulator manager 400 is operated to coordinate transfer of the respective state data associated with the memory facilitator 312 and the at least one hardware emulator 302, 360 from the current location to a different location, and track progress of the transfer of the respective state data associated with the memory facilitator 312 and the at least one hardware emulator 302, 360 to the different location.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A server comprising:
   a hardware platform comprising hardware resources with at least a portion of said hardware resources to be allocated as virtualized resources;
   a hypervisor being provided based on execution of code instructions by said hardware platform; and
   at least one virtual machine operating as an independent guest computing device, with at least a portion of the virtualized resources being allocated by said hypervisor to said at least one virtual machine;
   said hypervisor comprising:
   a memory facilitator to provide memory from the hardware resources within said hardware platform for said at least one virtual machine, with the memory having state data associated therewith at a current location within said at least one virtual machine,
   at least two hardware emulators, each hardware emulator to provide at least one set of hardware resources from said hardware platform for said at least one virtual machine, with the at least one set of hardware resources having state data associated therewith at the current location within said at least one virtual machine,
   a toolstack to control said hypervisor including generation of a start state data transfer request, with the start state data transfer request including a list of resources having state data to be transferred;
   an emulator manager configured to:
   receive from said tool stack the start state data transfer request to coordinate transfer of respective state data associated with said memory facilitator and state data associated with at least one of the hardware emulators of the at least two hardware emulators including in the list of resources,
   provide the start state data transfer request to said memory facilitator and said at least one of the hardware emulators to start transferring the respective state data from the current location to a different location with respect to the current location,
   receive a progress report from said memory facilitator and said at least one of the hardware emulators providing a progress level on transfer of the respective state data from the current location to the different location,
   track the progress level on transfer of the respective state data from the current location to the different location,
   stop execution of said at least one virtual machine and provide a pause request to said memory facilitator and said at least one of the hardware emulators to stop executing when the progress level on transfer of the respective state data reaches a predetermined progress level,
   receive a confirm pause request reply from said memory facilitator and said at least one of the hardware emulators indicating that said memory facilitator and said at least one of the hardware emulators are at a point to stop executing,
   provide a suspend virtual machine confirmation to said toolstack indicating that said at least one virtual machine has stopped executing, and
   provide a suspended complete command to said memory facilitator and said at least one of the hardware emulators so that remaining respective state data is transferred from the current location to the different location,
   receive a state data transfer completed command from said memory facilitator and said at least one of the hardware emulators when the transfer of the respective state data from the current location to the different location is completed,
   provide the state data transfer completed command to said toolstack, and
   stop coordinating transfer and tracking of the respective state data.

2. The server according to claim 1 wherein the respective state data from said memory facilitator and said at least one of the hardware emulators are transferred in parallel to the different location.

3. The server according to claim 1 wherein a majority of the respective state data are transferred while said at least one virtual machine is executing.

4. The server according to claim 1 wherein the predetermined progress level corresponds to when an amount of the respective state data still needing to be transferred while said at least one virtual machine is executing is not being reduced.

5. The server according to claim 1 wherein the respective state data are iteratively transferred to the different location; and wherein the predetermined progress level is based on a number of iterations having been performed reaching a predetermined number.

6. The server according to claim 5 wherein the iterative transfer of the respective state data comprises iteratively writing pages to the different location, and if any initial pages that were written to the different location were modified after being sent, then the modified pages are re-sent to the different location.

7. The server according to claim 6 wherein said hypervisor further comprises a modified page tracker configured to track the modified pages and coordinate the same with said memory facilitator and said at least one of the hardware emulators.

8. The server according to claim 1 wherein the different location receiving the transfer of the respective state data is at least one of a file and disk within the server.

9. The server according to claim 1 wherein the different location receiving the transfer of the respective state data is a different physical machine.

10. A method for transferring state data of at least one virtual machine operating within a server, wherein the server comprising:
a hardware platform comprising hardware resources with at least a portion of the hardware resources to be allocated as virtualized resources;
a hypervisor being provided based on execution of code instructions by the hardware platform; and
the at least one virtual machine operating as an independent guest computing device, with at least a portion of the virtualized resources being allocated by the hypervisor to the at least one virtual machine;
wherein the hypervisor comprising: a memory facilitator, at least two hardware emulators, an emulator manager and a toolstack, wherein the method comprising:
operating the memory facilitator to provide memory from the hardware resources within the hardware platform for the at least one virtual machine, with the memory having state data associated therewith at a current location within the at least one virtual machine;
operating the at least two hardware emulators, each hardware emulator to provide at least one set of hardware resources from the hardware platform for the at least one virtual machine, with the at least one set of hardware resources having state data associated therewith at the current location within the at least one virtual machine;
operating the toolstack to control the hypervisor including generation of a start state data transfer request, with the start state data transfer request including a list of resources having state data to be transferred; and
operating the emulator manager to perform the following:
receive from the tool stack the start state data transfer request to coordinate transfer of respective state data associated with the memory facilitator and state data associated with at least one of the hardware emulators of the at least two hardware emulators including in the list of resources,
provide the start state data transfer request to the memory facilitator and the at least one of the hardware emulators to start transferring the respective state data from the current location to a different location with respect to the current location,
receive a progress report from the memory facilitator and the at least one of the hardware emulators providing a progress level on transfer of the respective state data from the current location to the different location,
track the progress level on transfer of the respective state data from the current location to the different location,
stop execution of the at least one virtual machine and provide a pause request to the memory facilitator and the at least one of the hardware emulators to stop executing when the progress level on transfer of the respective state data reaches a predetermined progress level,
receive a confirm pause request reply from the memory facilitator and the at least one of the hardware emulators indicating that the memory facilitator and the at least one of the hardware emulators are at a point to stop executing,
provide a suspend virtual machine confirmation to the toolstack indicating that the at least one virtual machine has stopped executing
provide a suspended complete command to the memory facilitator and the at least one of the hardware emulators so that remaining respective state data is transferred from the current location to the different location,
receive a state data transfer completed command from the memory facilitator and the at least one of the hardware emulators when the transfer of the respective state data from the current location to the different location is completed,
provide the state data transfer completed command to the toolstack, and
stop coordinating transfer and tracking of the respective state data.

11. The method according to claim 10 wherein the respective state data from the memory facilitator and the at least one of the hardware emulators are transferred in parallel to the different location.

12. The method according to claim 10 wherein a majority of the respective state data are transferred while the virtual machine is executing.

13. The method according to claim 10 wherein the predetermined progress level corresponds to when an amount of the respective state data still needing to be transferred while the virtual machine is executing is not being significantly reduced.

14. The method according to claim 10 wherein the respective state data are iteratively transferred to the different location; and wherein the predetermined progress level is based on a number of iterations having been performed reaching a predetermined number.

15. A non-transitory computer readable medium storing a plurality of computer executable instructions for at least one virtual machine in a server, wherein the server comprising:
a hardware platform comprising hardware resources with at least a portion of the hardware resources to be allocated as virtualized resources;
a hypervisor being provided based on execution of code instructions by the hardware platform; and,
the at least one virtual machine operating as an independent guest computing device, with at least a portion of the virtualized resources being allocated by the hypervisor to the at least one virtual machine;
wherein the hypervisor comprising: a memory facilitator, at least two hardware emulators, an emulator manager and a toolstack, wherein executing of the plurality of computer executable instructions causing the at least one virtual machine to perform steps comprising:
operating the memory facilitator to provide memory from the hardware resources within the hardware platform for the at least one virtual machine, with the memory having state data associated therewith at a current location within the at least one virtual machine;
operating the at least two hardware emulators, each hardware emulator to provide at least one set of hardware resources from the hardware platform for the at least one virtual machine, with the at least one set of hardware resources having state data associated therewith at the current location within the at least one virtual machine;

operating the toolstack to control the hypervisor including generation of a start state data transfer request, with the start state data transfer request including a list of resources having state data to be transferred; and operating the emulator manager to perform the following:

receive from the tool stack the start state data transfer request to coordinate transfer of respective state data associated with the memory facilitator and state data associated with at least one of the hardware emulators of the at least two hardware emulators including in the list of resources, provide the start state data transfer request to the memory facilitator and the at least one of the hardware emulators to start transferring the respective state data from the current location to a different location with respect to the current location, receive a progress report from the memory facilitator and the at least one of the hardware emulators providing a progress level on transfer of the respective state data from the current location to the different location, track the progress level on transfer of the respective state data from the current location to the different location, stop execution of the at least one virtual machine and provide a pause request to the memory facilitator and the at least one of the hardware emulators to stop executing when the progress level on transfer of the respective state data reaches a predetermined progress level, receive a confirm pause request reply from the memory facilitator and the at least one of the hardware emulators indicating that the memory facilitator and the at least one of the hardware emulators are at a point to stop executing, provide a suspend virtual machine confirmation to the toolstack indicating that the at least one virtual machine has stopped executing, provide a suspended complete command to the memory facilitator and the at least one of the hardware emulators so that remaining respective state data is transferred from the current location to the different location, receive a state data transfer completed command from the memory facilitator and the at least one of the hardware emulators when the transfer of the respective state data from the current location to the different location is completed, provide the state data transfer completed command to the toolstack, and stop coordinating transfer and tracking of the respective state data.

16. The non-transitory computer readable medium according to claim 15 wherein the respective state data from the memory facilitator and the at least one of the hardware emulators are transferred in parallel to the different location.

17. The non-transitory computer readable medium according to claim 15 wherein a majority of the respective state data are transferred while the virtual machine is executing.

* * * * *